(12) United States Patent
Targiroff et al.

(10) Patent No.: US 6,298,970 B1
(45) Date of Patent: Oct. 9, 2001

(54) INFLATABLE EVACUATION SLIDE WITH ADJUSTABLE DECELERATOR

(75) Inventors: Alexandre Targiroff, Howell; Dean H. Staudt, Lakewood, both of NJ (US)

(73) Assignee: Air Cruisers Company, Wall, NJ (US)

( * ) Notice: Subject to any disclaimer, the term of this patent is extended or adjusted under 35 U.S.C. 154(b) by 0 days.

(21) Appl. No.: 09/572,141

(22) Filed: May 17, 2000

(51) Int. Cl.⁷ ................................................ B65G 11/10
(52) U.S. Cl. ................................. 193/25 B; 182/48
(58) Field of Search ..................... 193/25 B; 244/137.2; 182/148, 149

(56) References Cited

U.S. PATENT DOCUMENTS

| | | |
|---|---|---|
| 3,258,800 | 7/1966 | Robinsky . |
| 3,339,690 | 9/1967 | Craig . |
| 3,458,009 | 7/1969 | Favors . |
| 3,656,579 | 4/1972 | Fisher et al. ........................... 182/48 |
| 4,018,321 | * 4/1977 | Fisher ................................. 193/25 B |
| 4,246,980 | 1/1981 | Miller .................................... 182/48 |
| 4,434,870 | 3/1984 | Fisher .................................... 182/48 |
| 5,967,254 | * 10/1999 | Lutzer ........................... 193/25 B X |
| 5,975,467 | * 11/1999 | O'Donnell et al. ............ 193/25 B X |

* cited by examiner

*Primary Examiner*—James R. Bidwell
(74) *Attorney, Agent, or Firm*—Lawrence G. Fridman

(57) ABSTRACT

An inflatable evacuation slide for use in aircraft, watercraft, buildings, and other structures, includes a first inflatable tubular member, a second inflatable tubular member spaced from the first inflatable tubular member, and a floor extending between the first and second inflatable tubular members. At least one adjustable deceleration tube is connected to the floor. The at least one deceleration tube is adjustable in height in response to the distance between the exit opening and ground. With this arrangement, the rate of descent of an evacuee descending the evacuation slide can be regulated based on the height of the exit opening.

20 Claims, 6 Drawing Sheets

INFLATABLE EVACUATION SLIDE WITH ADJUSTABLE DECELERATOR

BACKGROUND OF THE INVENTION

1. Field of the Invention

This invention relates generally to inflatable structures, and more particularly to evacuation slides with means for adjusting the rate of descent of an evacuee.

2. Description of the Related Art

The inflatable evacuation slides and/or slide rafts provide a rapid means for evacuating passengers from commercial aircraft in the event of an emergency. These inflatable structures are normally stored uninflated within an aircraft. In use it is only necessary to open the door to automatically deploy the slide in the event of an emergency evacuation. When the door is opened, the gravity can take effect to unfold or unroll the slide outside of the doorway. Once outside the doorway, the slide is rapidly inflated through the application of air pressure and is ready for receiving evacuating passengers within a very short period of time following door opening.

Although the rate of evacuee descent is dependent on many factors, it is primarily governed by the angle formed between the slide surface and the ground. The optimum rate of descent for evacuees is usually achieved when the angle between the slide surface and ground is between about 30° and 50°. If the angle is much greater than 50°, the slide surface may be too steep and may result in evacuee injury upon impact with the ground.

In many instances, the ideal range of angles cannot be controlled since the slide surface has a fixed length and since the exit door may be at different heights. In emergency situations where one or more of the aircraft landing gears are damaged or collapsed, the aircraft itself may be tilted or canted at a number of different possible angles. Consequently, the aircraft door may be considerably higher with respect to the ground than in a normal landing position. With the increase in height between the door and ground, the angle between the slide and ground also increases, leading to an undesirable rate of descent for evacuees. This phenomena can also occur for normal landing positions when the evacuation slide encounters terrain which varies in slope.

In recognition of this problem, a number of proposals have been advanced in order to control the speed at which an evacuee travels down the slide. By way of example, U.S. Pat. No. 4,246,980 proposes an evacuation slide with a deceleration panel at a lower end thereof. The deceleration panel includes a fixed number of transversely extending grooves and ridges that, during sliding are contacted by an evacuee, so as to slow the evacuee's rate of descent. Although the grooves and ridges located at only the lower end of the inflatable may be effective in slowing the evacuee's rate of descent before exiting the slide, no provision has been made for controlling the rate of descent along its entire length. Thus, where the angle of the slide with respect to horizontal is great, the evacuee may experience undesirable acceleration along a substantial portion of the length of the slide before contacting the deceleration panel. Moreover, since the ridges in this slide are of a fixed number and of a predetermined height, they cannot substantially vary the rate of descent based on the particular landing conditions of the aircraft.

SUMMARY OF THE INVENTION

It is therefore an object of the present invention to provide an inflatable slide that includes means for adjusting the rate of descent of an evacuee to thereby accommodate different landing conditions of an aircraft.

It is a further object of the present invention to provide an inflatable slide with a fairly constant rate of descent along a substantial length of the slide for different landing conditions of the aircraft.

It is an even further object of the present invention to provide an inflatable slide with deceleration tubes that are separately and independently inflatable.

It is an even further object of the present invention to provide an inflatable slide with deceleration tubes that can be selectively inflated by the command of an operator.

According to the present invention, an inflatable evacuation slide includes a first inflatable tubular member, a second inflatable tubular member spaced from the first inflatable tubular member, and a floor extending between the first and second inflatable tubular members. At least one adjustable deceleration tube is connected to the floor. The at least one deceleration tube having adjustable characteristics in response to the distance between the exit opening and ground. With this arrangement, the rate of descent of an evacuee on the evacuation device can be regulated based on the height of the exit opening.

The tubular members, floor, and the at least one deceleration tube can be constructed of a flexible material, such that the inflatable evacuation device can be stored in a compact manner prior to deployment.

The foregoing and other features and advantages of the invention will be apparent from the following more particular description of preferred embodiments of the invention, as illustrated in the accompanying drawings.

BRIEF DESCRIPTION OF THE DRAWINGS

The preferred embodiments of the present invention will hereinafter be described in conjunction with the appended drawings, where like designations denote like elements, and.

DETAILED DESCRIPTION OF THE PREFERRED EMBODIMENTS

Figure 1:
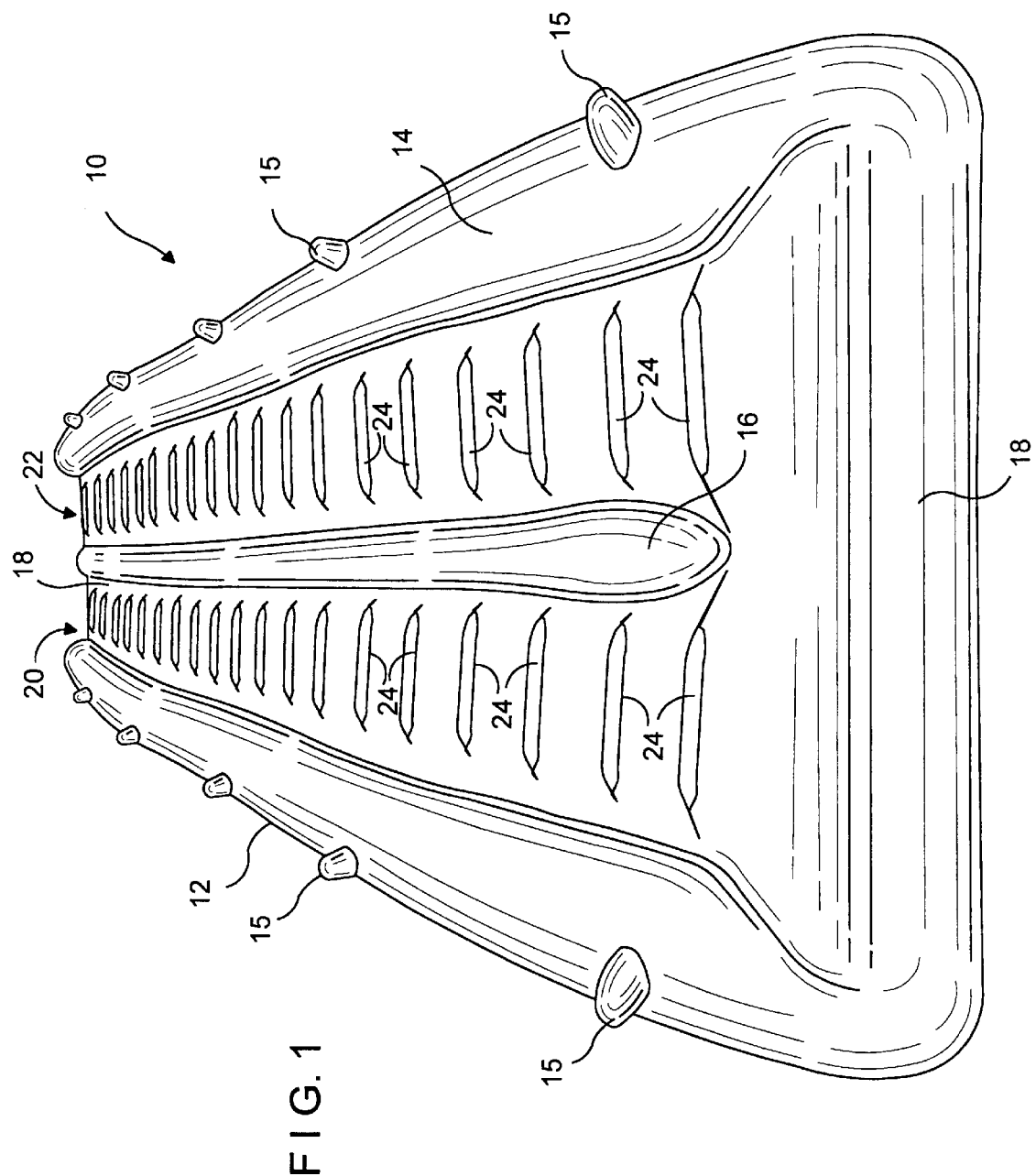
FIG. 1 is a perspective view of an inflatable evacuation slide according to the present invention as viewed from a lower end of the slide toward an upper end thereof.

Referring now to the drawings, and to FIG. 1 in particular, an inflatable evacuation slide 10 according to the present invention is illustrated. The slide 10 comprises at least outer longitudinally extending inflatable beams 12, 14, an inner longitudinally extending inflatable beam 16 positioned between the outer beams, and a floor 18 extending between the inner beam and each of the outer beams. In addition to providing structural support for the floor 18, the beams 12, 14 and 16 define a pair of guide channels 20, 22 for guiding evacuees along the floor 18 in the proper direction during evacuation from the aircraft. Supports 15 may be provided on the beams 12, 14 in a well known manner.

The beams are preferably constructed of a woven fabric that is strong, flexible, light weight, puncture-resistant, abrasion-resistant, and impervious to air and water. A suitable fabric is woven nylon coated with polyurethane or other elastomeric material. The polyurethane coating enhances air and water tightness of the slide when inflated. It is to be understood, of course, that other materials and/or coatings can be used for the slide 10. The floor 18 may be constructed of the same material as the beams 12, 14 and 16, although it does not have to be impervious to fluids.

The slide 10 as illustrated in FIG. 1 is shown for illustrative purposes only and may comprise any one of many different configurations. The manner in which the slide 10 is attached to the doorway of an aircraft and deployed during emergency situations is well known and will not be further described herein.

A plurality of inflatable deceleration tubes 24 are connected to the floor 18 in the guide channels 20 and 22. The deceleration tubes 24 preferably extend transverse to the beams 12, 14 and 16, and thus transverse to the direction of sliding movement of an evacuee. In a preferred embodiment, the deceleration tubes 24 are spaced at intervals of about 30 inches. Of course, this dimension may greatly vary depending on the type of aircraft, slide configuration, and the amount of deceleration desired.

Figure 2:
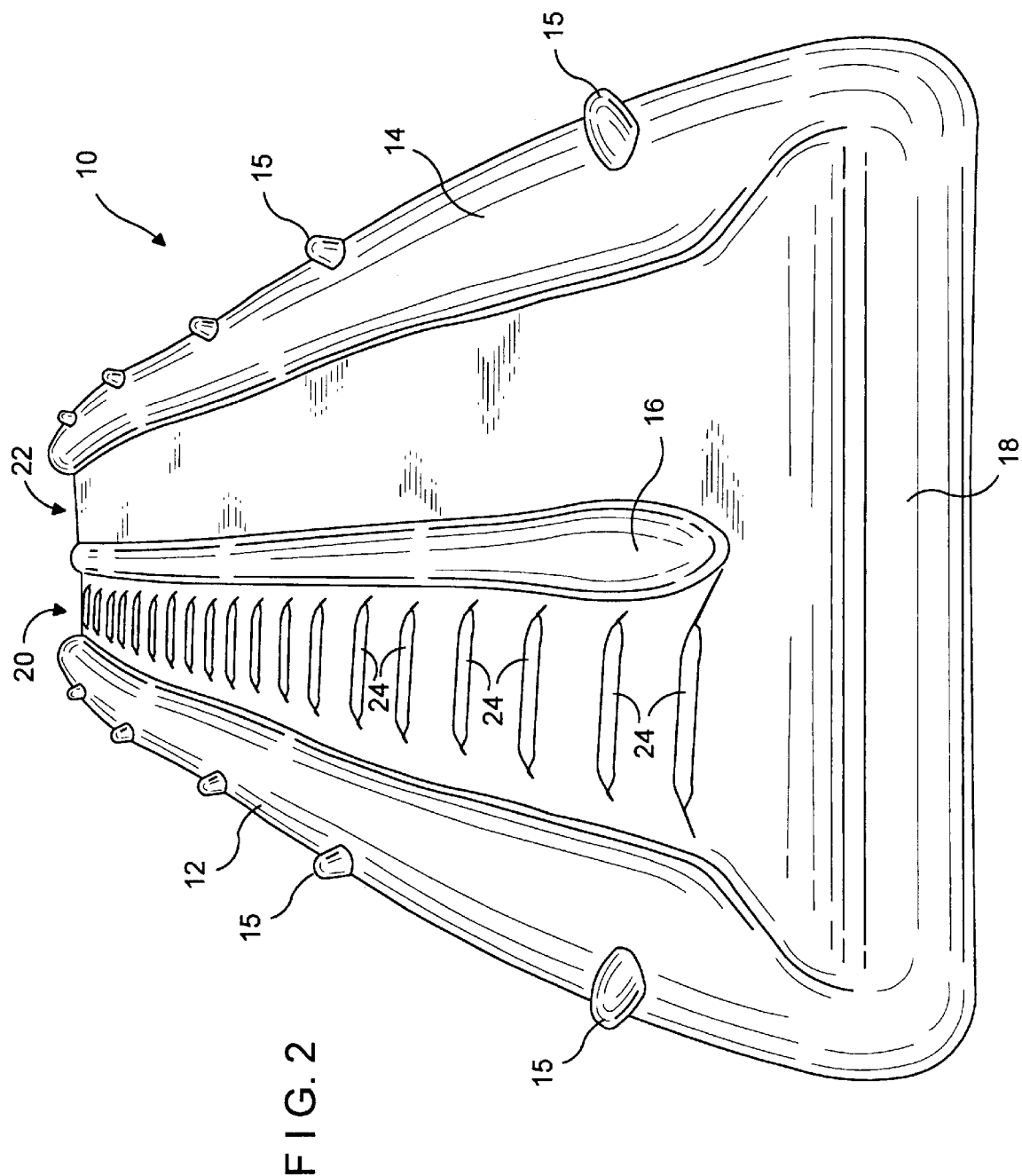
FIG. 2 is a perspective view of an inflatable evacuation slide according to a further embodiment of the invention as viewed from a lower end of the slide toward an upper end thereof.

In an alternative embodiment, and with reference to FIG. 2, the guide channel 22 is void of the deceleration tubes 24 to provide a smooth sliding surface free of obstructions. With such an arrangement, the guide channel 22 may be used to unload luggage or other items from the interior of the aircraft, or to more quickly unload passengers when events on the aircraft pose a greater risk to personal injury than exiting the slide 10 through the guide channel 20. It is to be understood, of course, that the guide channel 20 may be void of decelerations tubes 24 while the guide channel 22 includes deceleration tubes. Furthermore, the evacuation slide can be formed with one channel having deceleration tubes.

In the embodiment of FIG. 1 or FIG. 2, the particular number of deceleration tubes 24 and their location along the length of the slide 10 may vary depending on the type of aircraft, length and width of the slide, the frictional resistance of the floor and deceleration tube material against sliding movement, and so on. By way of example, a limited number of deceleration tubes may be located at only a lower portion, mid portion, or upper portion of the slide, or any combination thereof.

Figure 3:
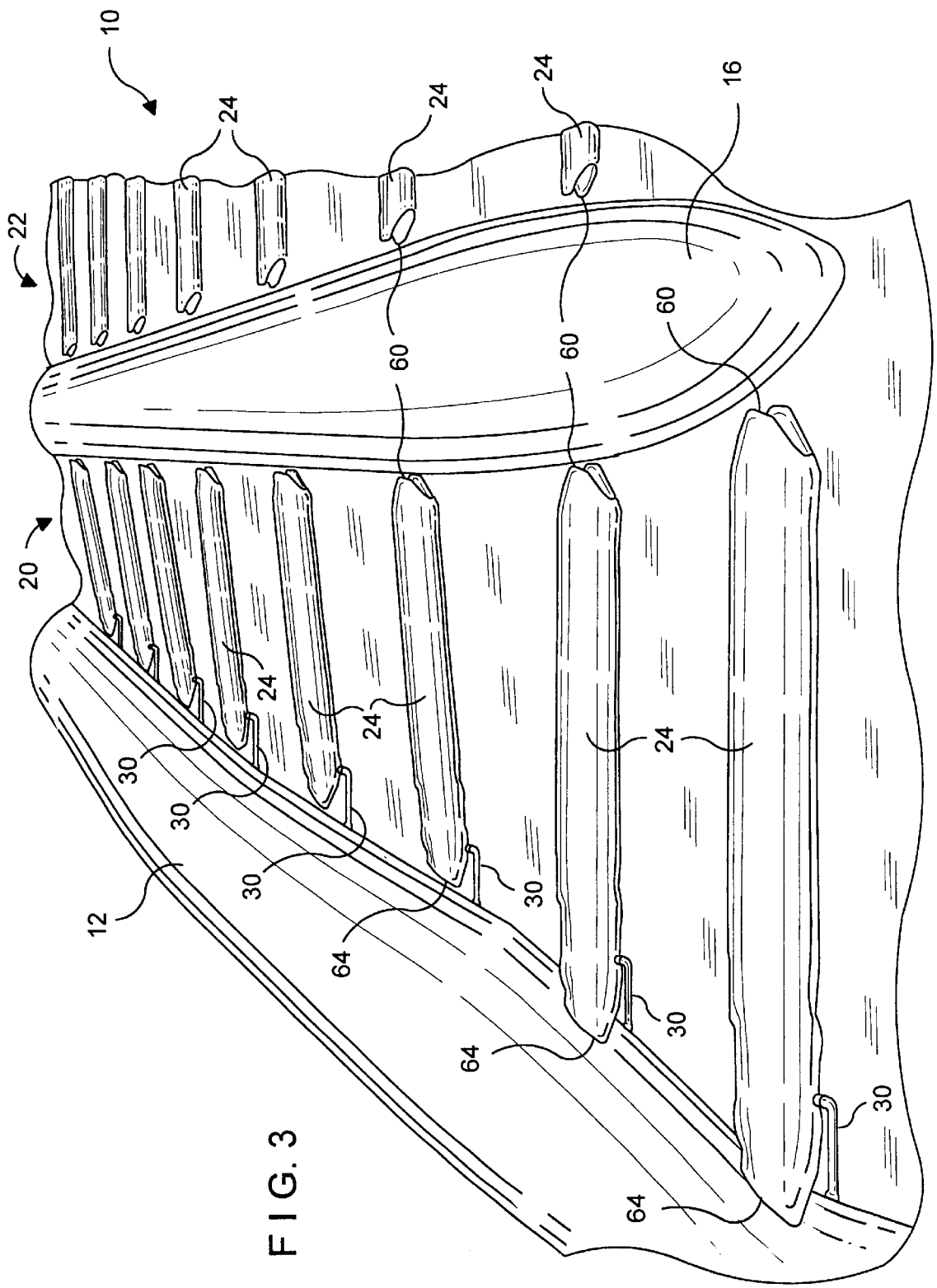
FIG. 3 is an enlarged perspective view of a portion of the evacuation slide of FIG. 1.

With particular reference now to an embodiment of the invention shown in FIG. 3, a fluid conduit 30 is connected to each deceleration tube 24 in order to provide fluid under pressure from a fluid supply (not shown). The fluid conduit 30 may be in fluid communication with the interior of the outer beam 12 or 14, or alternatively with the inner beam 16, so that the deceleration tubes 24 are automatically inflated upon deployment and inflation of the beams 12, 14 and/or 16. However, according to an alternative embodiment of the invention, the deceleration tubes 24 are separately and independently inflatable with respect to the beams 12, 14 and 16 through a source of compressed gas that is independent of the source adapted for inflating the evacuation slide. Valves (not shown) or other means may be provided for manually or automatically selectively directing air or other gas under pressure to one or more deceleration tubes or one or more sets of deceleration tubes. This process depends on the sill height of the aircraft door during various landing conditions, as will be described in greater detail below. In this manner, the rate of evacuee descent can be controlled with much greater precision over prior art evacuation slides.

Figure 4:
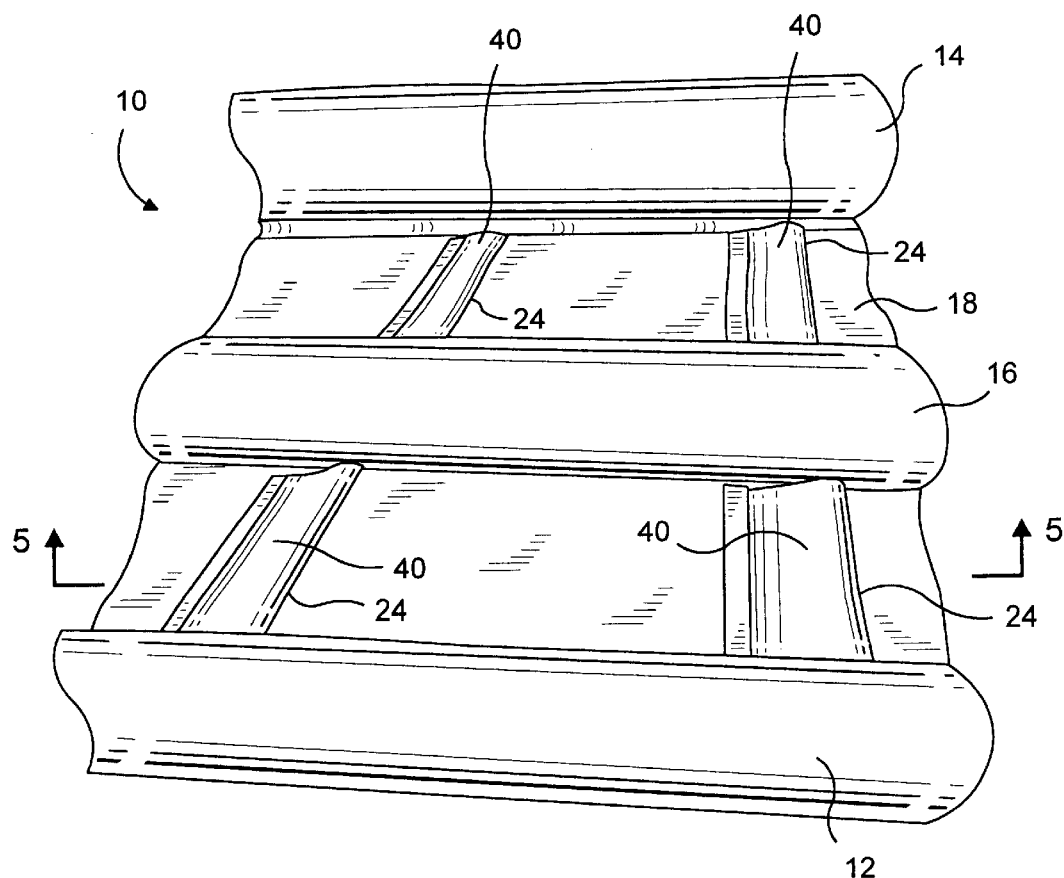
FIG. 4 is an enlarged perspective view of a portion of the evacuation slide of FIG. 1 as seen from the left side of FIG. 1; with the deceleration tubes in the deflated condition.
Figure 5:
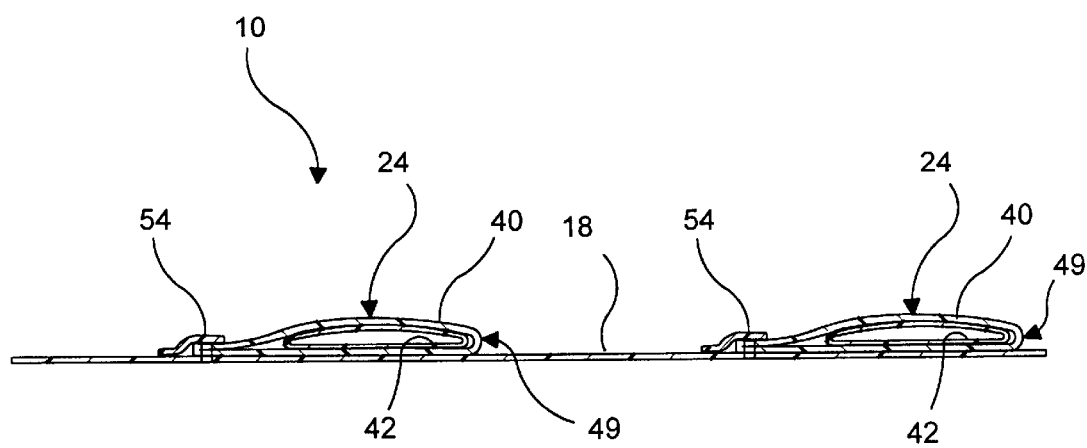
FIG. 5 is a cross sectional view taken along line 5—5 of FIG. 4.
Figure 6:
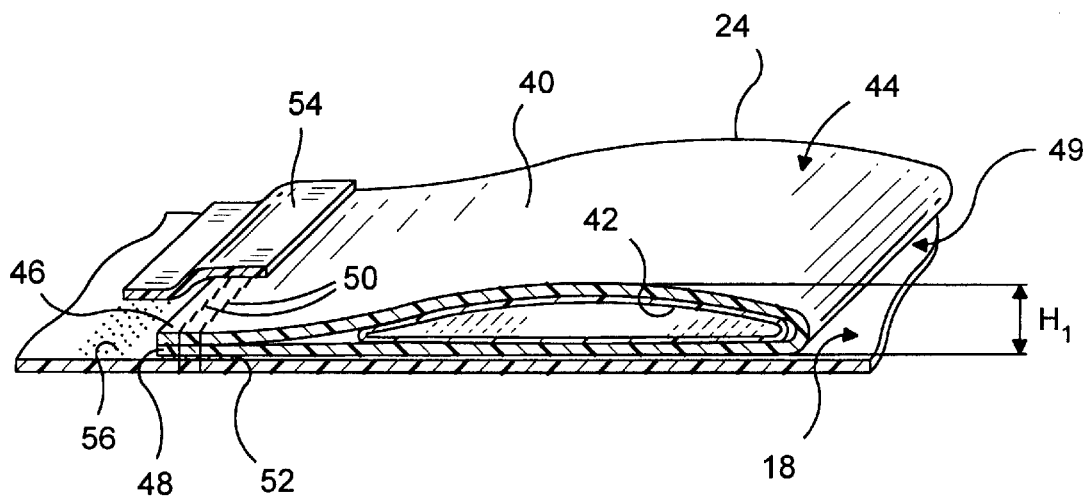
FIG. 6 is an enlarged perspective view in partial cross section of a deceleration tube assembly in a first inflated condition according to the invention.

With reference now to FIGS. 4 to 6, each deceleration tube 24 according to an exemplary embodiment of the invention comprises an outer sleeve 40 and an inner inflatable tube 42 that is connectable to the pressurized fluid supply. The outer sleeve 40 is attached to the floor 18 and is preferably constructed of the same material as the floor, such as polyurethane coated nylon, so that the same frictional resistance is encountered when sliding on the floor 18 and outer sleeve 40. The floor 18 and the outer sleeves 40 are intended to be a sliding surface and therefore need not be constructed of an air impermeable fabric per se. The inner tube 42 is a separate bladder that is removably insertable into the outer sleeve 40, and is preferably constructed of the same air and water impermeable material as inflatable structure elements in general, and the beams 12, 14 and 16 specifically. In this manner, the inner tube 42 can easily be replaced when a leak occurs or for any reason. Since the outer sleeves 40 and floor 18 do not require an air impermeable material, they can be constructed of a more robust fabric than the inner tubes 42 and the beams 12, 14 and 16. This arrangement provides better support to the weight of evacuees, provides greater resistance to wear, and more easily meet any required frictional characteristics resistant to sliding movement. According to a preferred embodiment of the invention, the outer sleeves 40 are of a urethane-coated woven nylon material with a relatively coarse mesh, while the inner tubes 42 are of a urethane-coated woven nylon material with a relatively fine mesh. The finer mesh of the inner tube material helps to hold the air in the inner tube 42, while the urethane coating enhances that function.

The outer sleeves 40 are preferably constructed of a single, elongate strip 44 of the urethane-coated woven nylon material with opposite ends 46 and 48. As shown, the opposite ends 46 and 48 of the strip 44 are superimposed and connected together to form a loop with a fixed end portion 45 that is connected to the floor 18 of the slide 10 and a free end portion 49 that is normally folded in the uninflated state. The fixed end portion 45 is connected to the floor 18 of the slide 10 through rows of stitching 50 that extend through the end portions 46, 48 and the floor 18. An adhesive layer 52 is preferably applied between the lower end portion 48 and the floor 18 prior to stitching. Although not shown, an adhesive layer may also be applied between the end portions 46 and 48. A tape 54 is then bonded to the end portion 46 and the floor 18 through an adhesive layer 56 to provide a positive seal surface that offers a smooth transition from the floor 18 to the deceleration tube during sliding movement of evacuees down the slide 10. The tape 54 may be constructed of the same material as the floor 18 and outer sleeve 40.

Although stitching and adhesive bonding are the preferred manner for attaching the ends 46, 48 to each other and to the floor 18, and although adhesive bonding is the preferred manner for attaching the tape 54 to the floor 18 and end 46, it is to be understood that other bonding techniques can alternatively or additionally be used. S Such bonding techniques can include heat bonding, ultrasonic welding, riveting or other mechanical fastening, and so on. The particular bonding technique may vary depending on the type of material used and the strength of bond desired, as well as other factors.

In an alternative embodiment, the ends 46, 48 may be connected to a lower surface of the floor with the remainder of the deceleration tube 24 extending through a slit (not shown) in the floor. In this manner, the tape 54 may be eliminated since a smooth transition between the floor and deceleration tube would be automatically provided for.

With additional reference to FIGS. 9 to 12, the strip 44 forming the outer sleeve 40 is partially closed along one edge 60 through a seam defined by rows of stitching 62. The stitching 62 does not extend into the floor 18, as shown most clearly in FIG. 12, so that the outer sleeve 40 is free to move along the floor 18 during inflation and deflation. The rows of stitching 62 extend only partially toward the free folded end 49 from the fixed end 45 of the strip 44 to form an envelope for receiving the inner tube 42. Preferably, the rows of stitching 60 extend just far enough along the edge 60 to provide a stop for the inner tube 42 during insertion into the outer sleeve 40 from the opposite edge 64 (FIG. 3) of the sleeve. This arrangement provides an opening 66 that is large enough to expand to the shape of the inner tube 42 during inflation of the inner tube. If the stitching 62 were to completely close the edge 60, the outer sleeve 40 would not be evenly expanded during inflation of the inner tube 42.

Figure 7:
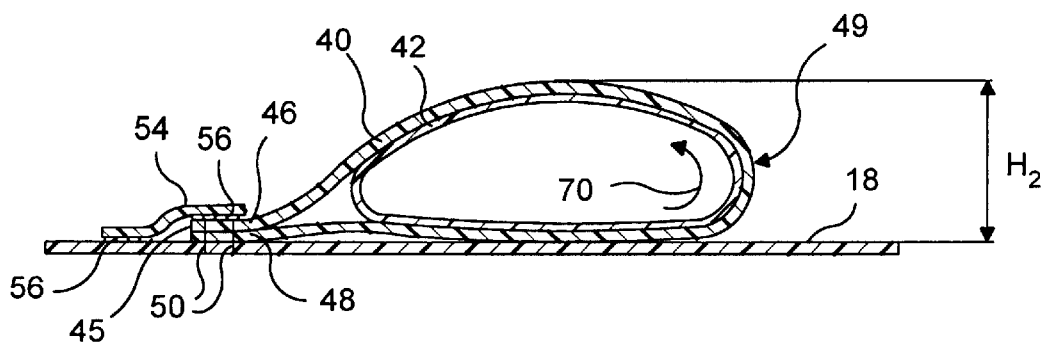
FIG. 7 is a cross sectional view of the deceleration tube in a second inflated condition.
Figure 8:
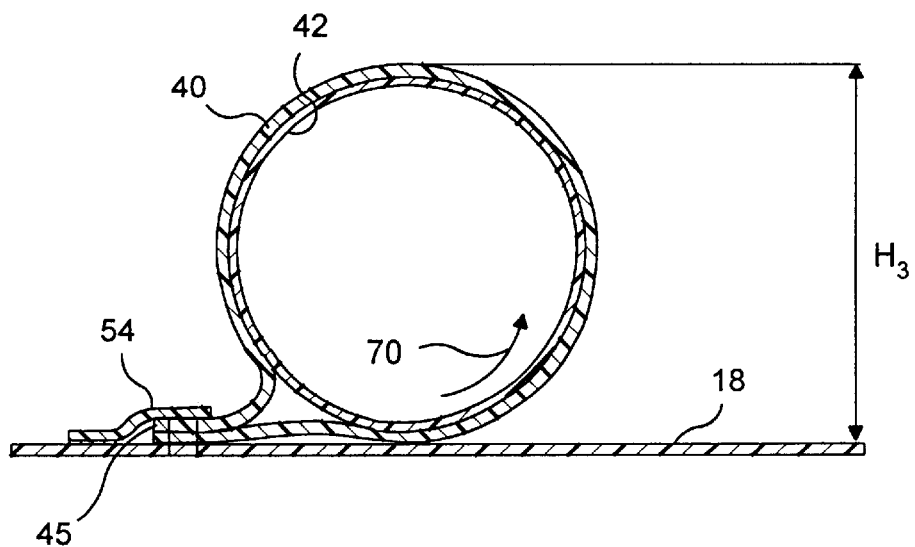
FIG. 8 is a cross sectional view of the deceleration tube in a third inflated condition.
Figure 9:
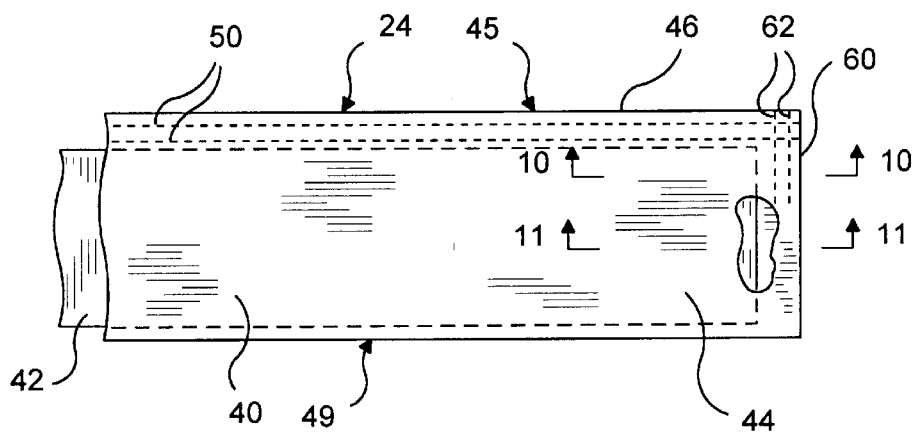
FIG. 9 is a top plan view of a portion of the deceleration tube with a portion of an outer covering cut away to reveal an inflatable inner tube.
Figure 10:
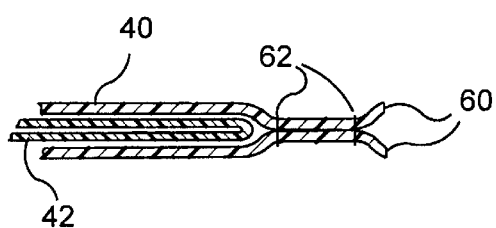
FIG. 10 is a cross sectional view taken along line 10—10 of FIG. 9.
Figure 11:
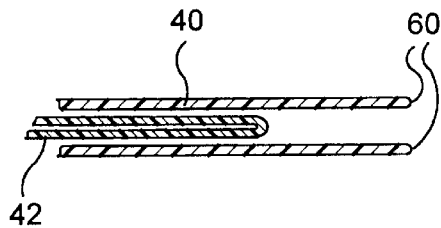
FIG. 11 is a cross sectional view taken along line 11—11 of FIG. 9.
Figure 12:
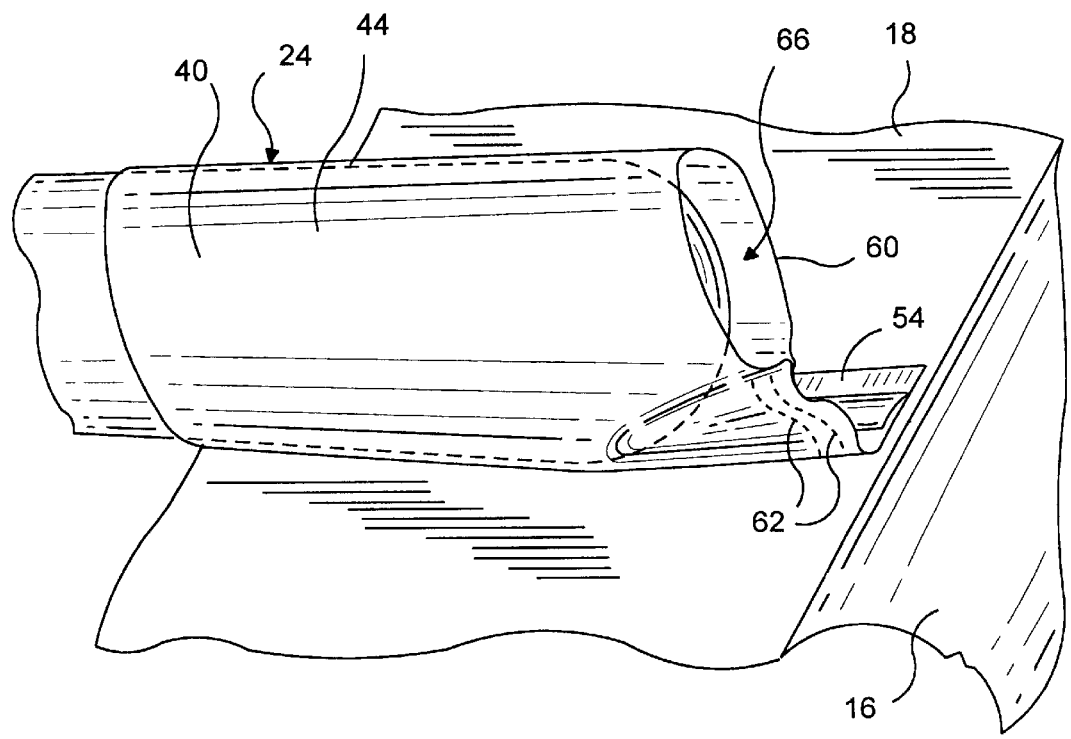
FIG. 12 is a perspective view of a portion of the deceleration tube and illustrating the manner in which an inner inflatable tube is positioned within an outer shell of the deceleration tube assembly.

Referring again to FIGS. 5 to 8, each deceleration tube 24 is in a deflated or flat condition (FIG. 5) prior to use in order to minimize the required storage space for the slide 10 prior to deployment. During evacuation situations where the slide 10 is deployed, one or more of the deceleration tubes 24 is initially inflated to a height $H_1$ shown in FIG. 6. Thereafter, the deceleration tubes 24 are inflated to a second height $H_2$ as shown in FIG. 7 and to a maximum height $H_3$, as shown in FIG. 8. Preferably, the maximum diameter of the inner tube 42 when fully inflated is approximately three inches at a pressure of about 2 psi or lower. In this manner, the evacuee does not become airborne or separated from the sliding area as might otherwise occur with larger deceleration tubes and/or pressures. This enables the invention to maintain a relatively constant rate of descent during the evacuation process.

The manner in which the outer sleeve 40 is attached to the floor 18 is particularly important during inflation and deflation of the deceleration tube 24. As shown in FIGS. 6 to 8, inflation of the inner tube 42 causes a lifting and rolling action of the outer sleeve 40 along the floor 18 in a direction as represented by arrow 70. The lifting and rolling action permits the free inflation of the inner tube 42 and avoids frictional sliding contact between the outer sleeve and floor. During deflation or when an evacuee travels over the deceleration tube 24, the outer sleeve 40 will tend to return toward the flat condition by rolling along the floor 18 in an opposite direction from the direction of inflation. In this manner, relatively little or no friction is encountered between the contacting surfaces of the outer sleeve 40 and floor 18. The tendency of the deceleration tube to revert to the folded condition when struck by an evacuee also provides a relatively smooth transition during sliding movement from the deceleration tube to the floor. If the free end 49 of the outer sleeve 40 were also connected to the floor, inflation of the deceleration tube 24 would be severely limited.

In operation, and by way of example, when a crew person determines the approximate height of the door above ground level, the number and location of deceleration tubes to be activated may be chosen by selecting switches, buttons, or other selection means on a user interface (not shown). The selection means is preferably associated with electrically controlled valves that open in response to an applied electrical field to thereby direct air or other fluid under pressure from a fluid supply to the selected deceleration tubes. The control valves may close after a predetermined time period or in response to a detected pressure or applied electrical signal to limit the amount of inflation in the deceleration tubes, as previously discussed. In one embodiment, a separate control valve is associated with each deceleration tube.

In an alternative embodiment, a single control valve is associated with a group of deceleration tubes. A first control valve may be associated with a first group of deceleration tubes at a lower portion of the slide, a second control valve may be associated with a second group of deceleration tubes at a middle portion of the slide, and a third control valve may be associated with a group of deceleration tubes at an upper portion of the slide. The groups may include any desired number of deceleration tubes, and different groups may have different numbers of deceleration tubes.

By way of example, for a normal door height, such as when the aircraft lands normally with all wheels intact on a substantially flat surface, the first group, which may comprise four or five deceleration tubes per guide channel 20, 22, is inflated to a predetermined tube height. When one landing gear collapses to cause a greater height differential between the ground and the aircraft door, the second group of deceleration tubes, which may also comprise four or five deceleration tubes, may be activated. At maximum height, the third group of deceleration tubes may be activated. Under any circumstances, the approximate velocity of an evacuee at the lower end of the slide 10 should be similar to the velocity when the evacuation slide is operated at the normal door height.

In yet a further embodiment, a single control valve may be actuable to operate all of the deceleration tubes independent of door height.

As an alternative to manual selection means for inflating one or more of the deceleration tubes and/or groups of deceleration tubes, an electronic height sensor (not shown) may be provided proximal the aircraft door to automatically determine the height between the door and ground. Signals from the height sensor can be used to automatically determine which deceleration tubes or group(s) of deceleration tubes should be actuated. This may be accomplished through the use of a microprocessor or other electronic circuitry.

It is to be understood that the terms upper, lower, right, left, inner, outer, and their respective derivatives as used herein refer to relative, rather than absolute positions.

While the invention has been disclosed with specific reference to the above-described embodiments, those skilled in the art will recognize that changes can be made in form and detail without departing from the spirit and the scope of the invention. By way of example, although the evacuation slide is intended primarily for use with aircraft, it is to be understood that the evacuation slide may be used in other environments where escape from an exit opening of other structures, such as a house or building, is necessary for personal safety. Thus, the described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

The embodiments for which an exclusive property or privilege is claimed are defined as follows:

1. An inflatable evacuation device adapted for deployment from an exit opening of an aircraft structure, the inflatable evacuation device comprising:

a first inflatable tubular member;

a second inflatable tubular member spaced from the first inflatable tubular member and extending substantially parallel thereto;

a floor extending between the first and second inflatable tubular members and being connected thereto, the floor being constructed of a flexible material, and at least one adjustable deceleration tube connected to the floor and extending generally transverse to the first and second tubular members, the at least one deceleration tube being adjustable in height in response to the distance between the exit opening and ground;

whereby the rate of descent of an evacuee on the evacuation device can be regulated based on the height of the exit opening.

2. An inflatable evacuation device according to claim 1, wherein the at least one deceleration tube comprises an outer sleeve connected to the floor and an inflatable inner tube located within the outer sleeve.

3. An inflatable evacuation device according to claim 2, wherein the outer sleeve comprises a strip of material having opposite ends that are joined together to form a loop for receiving the inner tube.

4. An inflatable evacuation device according to claim 3, wherein the joined opposite ends of the outer sleeve are fixedly connected to the floor such that a free end of the loop is free to roll along the floor during inflation and deflation of the inner tube.

5. An inflatable evacuation device according to claim 4, and further comprising a tape member overlapping the joined opposite ends and the floor for providing a relatively smooth transition between the floor and the deceleration tube during sliding movement by an evacuee.

6. An inflatable evacuation device according to claim 4, wherein a side of the loop is joined together at a seam to form an envelope for receiving and holding the inner tube.

7. An inflatable evacuation device according to claim 6, wherein the seam extends from the joined opposite ends toward the free end of the loop.

8. An inflatable evacuation device according to claim 7, wherein the seam has a length that at least substantially unrestricts the shape of the inner tube during inflation.

9. An inflatable evacuation device according to claim 2, wherein the at least one deceleration tube being adjustable in height in response to a command of an operator, the outer sleeve and floor are constructed of the same material to provide at least substantially identical friction surfaces.

10. An inflatable evacuation device according to claim 9, wherein the outer sleeve and floor are constructed of an elastomeric coated woven material.

11. An inflatable evacuation device according to claim 10, wherein the inner tube is construed of an elastomeric coated woven material.

12. An inflatable evacuation device according to claim 11, wherein the woven material of the inner tube has a tighter mesh than the woven material of the outer sleeve and floor.

13. An inflatable evacuation device according to claim 12, wherein the woven materials for the outer sleeve, floor, and inner tube are nylon.

14. An inflatable evacuation device according to claim 1, wherein the at least one deceleration tube comprises a plurality of deceleration tubes connected to the floor at discreet, spaced-apart locations.

15. An inflatable evacuation device according to claim 14, wherein the adjustable deceleration tubes are adapted for connection to a pressurized fluid supply for inflating the deceleration tubes from a substantially flat condition to a fully inflated condition.

16. An inflatable evacuation device according to claim 15, wherein each deceleration tube is selectively actuable for inflation independent of the other deceleration tubes.

17. An inflatable evacuation device according to claim 15, wherein the deceleration tubes are divided into at least a first group of deceleration tubes and a second group of deceleration tubes, the first and second groups being selectively actuable for inflating their respective deceleration tubes in response to the height of the exit opening.

18. An inflatable evacuation device according to claim 17, wherein the first group of deceleration tubes is located at a lower end portion of the floor and the second group of deceleration tubes is located at one of a middle portion and upper end portion of the floor.

19. An inflatable evacuation device according to claim 18, wherein the first group is actuated when the exit opening is at a first height and the second group is actuated when the exit opening is at a second height greater than the first height.

20. An inflatable evacuation device according to claim 19, wherein the first and second groups are actuated when the exit opening is at the second height.

\* \* \* \* \*